United States Patent [19]

Kasdan

[11] Patent Number: 5,625,709
[45] Date of Patent: Apr. 29, 1997

[54] METHOD AND APPARATUS FOR IDENTIFYING CHARACTERISTICS OF AN OBJECT IN A FIELD OF VIEW

[75] Inventor: Harvey L. Kasdan, Van Nuys, Calif.

[73] Assignee: International Remote Imaging Systems, Inc., Chatsworth, Calif.

[21] Appl. No.: 363,380

[22] Filed: Dec. 23, 1994

[51] Int. Cl.[6] ............................................. G06K 9/46
[52] U.S. Cl. ...................................... 382/203; 382/199
[58] Field of Search ................................. 382/173, 192, 382/199, 201, 203, 204, 205

[56] References Cited

U.S. PATENT DOCUMENTS

| | | | |
|---|---|---|---|
| 3,805,028 | 4/1974 | Morton | 382/204 |
| 4,069,411 | 1/1978 | Morton | 382/192 |
| 4,115,803 | 9/1978 | Morton | 382/199 |
| 4,115,805 | 9/1978 | Morton | 382/205 |
| 4,115,806 | 9/1978 | Morton | 382/201 |
| 4,183,013 | 1/1980 | Agrawala et al. | 382/199 |
| 4,338,024 | 7/1982 | Bolz et al. | 356/23 |
| 4,361,830 | 11/1982 | Honma et al. | 382/199 |
| 4,538,299 | 8/1985 | DeForest | 382/201 |
| 4,833,722 | 5/1989 | Morton et al. | 382/199 |
| 4,866,783 | 9/1989 | Ohyama | 382/199 |

*Primary Examiner*—Jose L. Couso
*Attorney, Agent, or Firm*—Ronald L. Yin; Limbach & Limbach LLP

[57] ABSTRACT

To identify the boundary pixels of a number of particles in the same field of view, an electrical image of the field of view is formed by a CCD raster scan device. The electrical signal from the CCD device is segmented and is digitized. The signals are processed such that the boundary pixels have non-zero values and are linked to one another. The values of the pixels are stored in a boundary memory addressable by a row signal and column signal. In an addressable index memory, a plurality of values are stored with each value being an address to the boundary memory where the pixels having the boundary are located. Finally, a location memory has the same addressable dimensions as the boundary memory. The location memory stores, in address locations corresponding to address locations in the boundary memory where the pixels having characteristics of interest are located, addresses to the addressable index memory.

14 Claims, 6 Drawing Sheets

FIG. 2a — PRIOR ART

| | | | | | | | |
|---|---|---|---|---|---|---|---|
| 20 | 12 | 11 | 5 | 4 | 3 | 7 | 10 |
| 3 | 15 | 23 | 17 | 70 | 13 | 11 | 9 |
| 2 | 23 | 45 | 105 | 96 | 87 | 30 | 25 |
| 6 | 8 | 89 | 93 | 72 | 85 | 67 | 50 |
| 28 | 31 | 42 | 79 | 84 | 97 | 65 | 41 |
| 15 | 14 | 22 | 37 | 78 | 120 | 95 | 51 |
| 30 | 78 | 24 | 43 | 54 | 47 | 39 | 28 |
| 25 | 14 | 6 | 8 | 9 | 7 | 10 | 16 |

FIG. 2b — PRIOR ART

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 1 | 1 | 1 | 1 | 0 | 0 |
| 0 | 0 | 1 | 1 | 1 | 1 | 1 | 0 |
| 0 | 0 | 0 | 1 | 1 | 1 | 1 | 0 |
| 0 | 0 | 0 | 0 | 0 | 1 | 0 | 0 |
| 0 | 0 | 0 | 0 | 0 | 0 | 0 | 0 |

FIG. 2c — PRIOR ART

| | X=1 | 2 | 3 | 4 | 5 | 6 | 7 | 8 |
|---|---|---|---|---|---|---|---|---|
| Y=1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 76 | 0 | 0 | 0 | 0 |
| 4 | 0 | 0 | 205 | 0 | 110 | 0 | 0 | 0 |
| 5 | 0 | 137 | 0 | 0 | 0 | 102 | 0 | 0 |
| 6 | 0 | 0 | 155 | 0 | 0 | 0 | 118 | 0 |
| 7 | 0 | 0 | 0 | 147 | 179 | 50 | 0 | 0 |
| 8 | 0 | 0 | 0 | 0 | 0 | 0 | 0 | 0 |

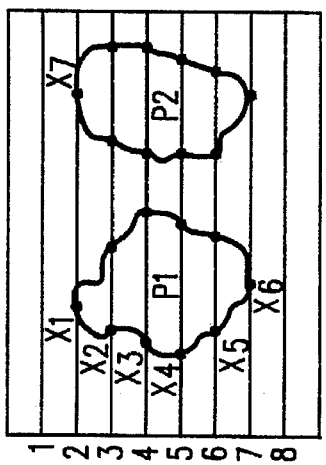
PRIOR ART
FIG. 4d
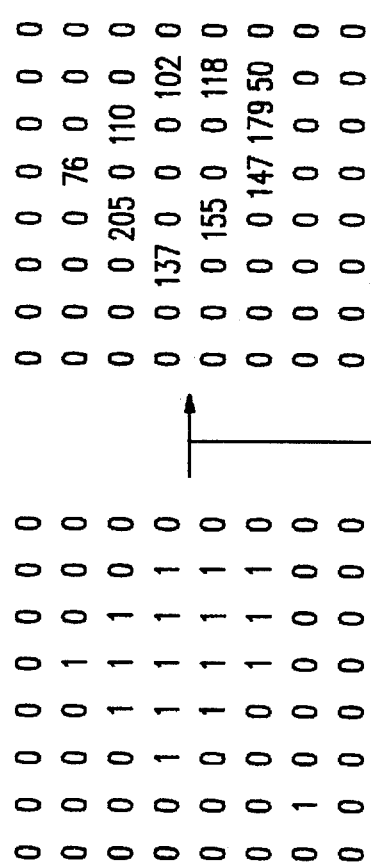
PRIOR ART
FIG. 4a
PRIOR ART
FIG. 4b
PRIOR ART
FIG. 4c
PRIOR ART
FIG. 4e
PRIOR ART
FIG. 4f

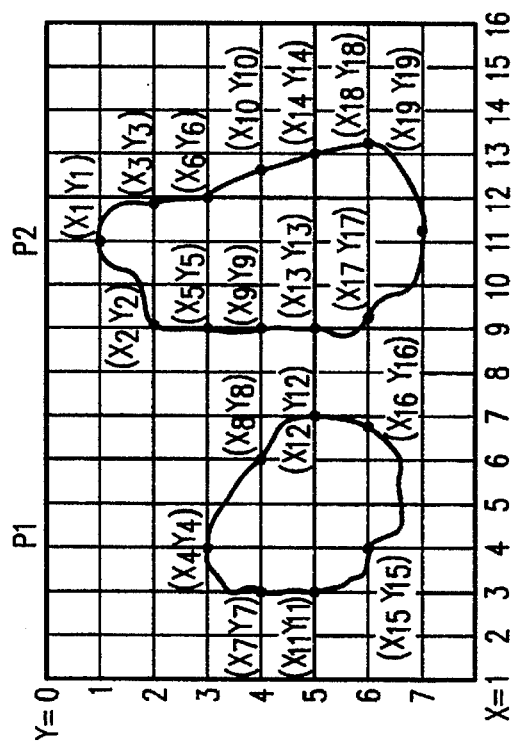
FIG. 6
FIG. 7
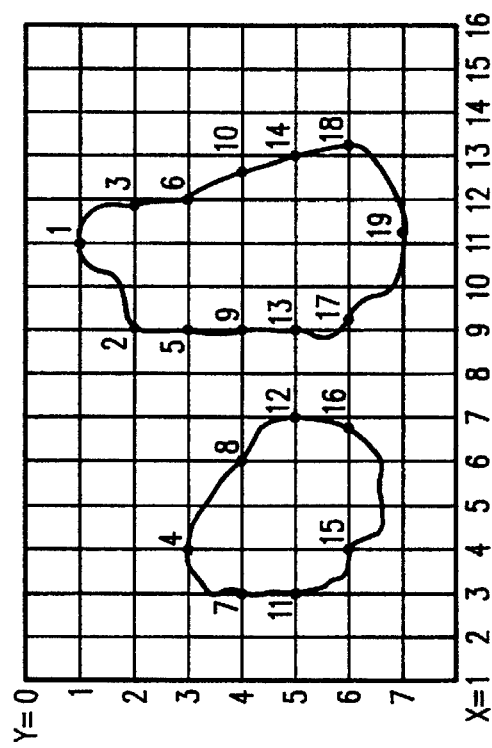
FIG. 8a
FIG. 8b

METHOD AND APPARATUS FOR IDENTIFYING CHARACTERISTICS OF AN OBJECT IN A FIELD OF VIEW

TECHNICAL FIELD

The present invention relates to a method and an apparatus for identifying certain characteristics of pixels in an image in a field of view. More particularly, the present invention relates to a method and an apparatus for rapidly identifying the pixels having the characteristics of interest.

BACKGROUND OF THE INVENTION

Apparatuses which can capture an image of a field of view, having objects of interest, such as biological particles, are well known in the art. Referring to FIG. 1, there is a shown a schematic block level diagram of an apparatus 10 of the prior art. The apparatus 10 is a urinalysis instrument marketed by International Remote Imaging Systems, Inc. of Chatsworth, Calif. under the trademark "YELLOW IRIS." The apparatus 10 comprise a microscope 12 directed to focus on a microscopic slide 14 or a flow cell 14, of the type disclosed in U.S. Pat. No. 4,338,024. The image of the field of view is captured by a CCD camera 16, which is a raster scan type device. The CCD camera 16 outputs a raster scan electrical signal which is supplied to a digitizer 18. The digitizer 18 segments the waveform into a plurality of electrical signals with each electrical signal representing a pixel of the image in the field of view. The digitizer 18 further digitizes the amplitude of each electrical signal to produce a greyscale. In the preferred embodiment, the digitizer 18 produces a digital signal having 256 greyscale values. The digitized signals in raster scan format are supplied to a comparator 20 to which a threshold value 22 is also supplied. In the event the digitized signal exceeds the threshold signal 22, then the comparator 20 outputs a binary signal of "1." In the event it does not, the comparator 20 outputs a binary signal of "0."

From the comparator 20, the binary signals are supplied to a shift register 24. The shift register 24 delays and stores the binary signals for two lines of the scan so that the signals in the shift register 24 may be operated upon by a boundary generator 26. The boundary generator 26 operates upon the pixel values stored in the shift register 24 to generate data signals in which the boundary pixels of an object in the field of view have non-zero values with all other pixel values, outside of the boundary and inside the boundary of the particle being zero. This data is then supplied to a boundary memory 28, and is stored therein in an array form with a plurality of pixels arranged in a plurality of rows and columns in the same manner as the field of view is imaged by the microscope 12.

The address to store the data signal from the boundary generator 26 is generated by an address generator 30. The address generator 30 comprises an X counter 32 which is incremented by a clock signal. It is reset by either the horizontal sync or the vertical sync signal passing through an OR gate 34. The address generator 30 also comprises a Y counter 36. The Y counter 36 counts the number of horizontal sync signals, and is reset by the vertical sync signal. The horizontal sync signal and the vertical sync signal are, of course, generated by the CCD camera 16.

The outputs of the X counter 32 and the Y counter 36 are supplied as address signals to the boundary memory 28. In this manner an array of pixel values are stored in the boundary memory 28 based upon the address signals from the address generator 30.

The boundary memory 28 is then accessed by a computer 40. The computer 40 locates the first pixel in the boundary memory 28 that has a boundary value, or a non-zero pixel value. From there, the edge of the particle is then traced based upon the look-up table 42 and is displayed on a display 44.

The foregoing apparatus 10 and the method of operating it is fully disclosed in U.S. Pat. No. 4,538,299.

Referring to FIG. 2a, there is shown a schematic view of an example of an output of the digitizer 18. As previously discussed, the output of the CCD camera 16 is a raster scan signal. Therefore, not all of the pixel signals would be present in an array form at the same time as depicted in FIG. 2a. However, conceptually, the output of the digitizer 18 is an array of pixel images having certain values ranging from zero to 255 greyscale. If, for example, the threshold 22 is set at 64, then the output of the comparator 20 would be an array of pixel values shown in FIG. 2b, wherein pixel values along the boundary and inside the boundary of a particle, and "noise" will have the value of "1" and all the rest of the pixels will have a "0" value. As a result of the operation by the boundary generator 26, FIG. 2c depicts an example of an array of pixels stored in a boundary memory 28, wherein boundary pixel values of the particle detected have non-zero values with pixel values within the boundary and outside the boundary of being "0". Again, this description can be found in U.S. Pat. No. 4,538,299.

The shortcoming of the apparatus 10 of the prior art is that in order for the computer 40 to locate the first pixel having the characteristic of interest, i.e. boundary, it must scan through the boundary memory 28 starting with X=1, Y=1; (or (1,1)), ... (8,1), (1,2), (4,2) until the first pixel of interest (having the value of 76) is located at (5,2). As can be seen, if the fluid of interest is dilute, such as urine, where many images may not have any particle of interest and hence no boundary pixel, the computer 40 would have wasted a lot of processing time. This limits the throughput of the apparatus 10.

In an improvement to the apparatus 10 shown in FIG. 1, International Remote Imaging Systems, Inc. of Chatsworth, Calif., marketed an apparatus 50 shown in FIG. 3. The apparatus 50 shown in FIG. 3 is substantially similar to the apparatus 10 shown in FIG. 1. Therefore, like numerals will be designated for like components. The apparatus 50 comprises all of the components shown in FIG. 1 with the addition of an index counter 52. The index counter 52 receives as an address signal the output of the Y counter 36. Thus, the index counter 52 has as many addressable locations in the Y direction as there are in the boundary memory 28. In addition, the output of the boundary generator 26 is supplied to a comparator 54 to which a binary signal of "1" has also been supplied. In the event the boundary generator 26 generates a non-zero pixel value, then the output of the comparator 54 is a binary signal of "1" which is then supplied to the index counter 52. The output of the comparator 54 increments the particular counter in index counter 52 addressed by the address from the Y counter 36. Finally, at the first location addressed by the output of the Y counter 36, the value of the X counter 32 is stored.

Referring to FIG. 4, there is shown in FIG. 4a and 4b the same schematic representation of an example of an array of pixel values for the output of the comparator 20 and the output of the boundary generator 26, respectively. In addition, FIG. 4c shows an example of an array of pixel values that is stored in the index counter 52. As previously discussed, the index counter 52 has as many address locations in the Y dimension as there are in the boundary memory 28. Thus, for the example shown in FIGS. 4b and 4c, each has 8 addressable "vertical" locations. For the index counter 52, the first column of data is a count of the number of pixels in that particular row (Y dimension) that have pixels of interest. Thus, for Y=1, there are no pixels having non-zero values. Therefore, the value in the column under # for Y=1 is zero. A second column in the index counter 52 labeled "L" is an address from the X counter 32 of the location of the first pixel having the characteristic of interest, i.e., the boundary of the particle, in that row. Thus, for example, in the address Y=2, in the second row of FIG. 4b, one pixel has a non-zero value and that is stored in the column under #. In addition, the location of this pixel is X=5 with 5 stored under the column "L."

In the operation of the apparatus 50 shown in FIG. 3, the computer 40 initially scans the index counter 52 until the first non-zero entry for # is found. Thereafter, the computer 40 would move to the address for the index counter 52 (e.g., Y=2) and to the X value under the column of "L." Thus, the computer 40 would then start the identification of the pixel of interest at X=5, Y=2. As each pixel within a particular row is "traced out" per the teaching of U.S. Pat. No. 4,538,299, the "L" value in that row is then zeroed out or is blanked out. In addition, the value under the column of # is decremented by 1 for each one pixel being traced out. For analysis of dilute fluids such as urine, the apparatus 50 in general is satisfactory for two reasons. First, it can rapidly scan an index counter 52 through N number of positions (where N represents the number of horizontal scans or rows of the array of pixels), to quickly determine whether or not there are any particles of interest in the field of view. This is in contrast to the apparatus 10 shown in FIG. 1 where a scan of N×M pixels must be made (where M is the number of horizontal pixels). Secondly, if there is a particle in the field of view, the method and apparatus as suggested by this prior art can quickly locate the starting point of the pixel having the characteristic of interest without scanning all the pixels preceding it in a raster scan fashion to arrive at the pixel having the characteristic of interest. Thus, the computer 40 can quickly begin the processing at the pixel location (5,2).

The problem, however, arises when there is more than one particle having pixels with characteristics of interest in the same field of view. For biological fluids which are not dilute, such as blood, this would be very common. Referring to FIG. 4d, there is shown an example of an image of a field of view having particles P1 and P2. The X location of the first pixel in any row (Y) having the characteristic of interest are identified (i.e., X1, X2, X3, X4, X5 and X6). A representation of the contents of the index counter 52 per the apparatus 50 of the prior art is shown in FIG. 4e. For the row Y=2, there are two pixels having characteristics of interest with the first pixel located at X=X1. Similarly, for row Y=3, there are four pixels with characteristics of interest in that row with the first having the value of X=X2.

The apparatus 50 operates by scanning the # column until the first non-zero is encountered. This occurs for Y=2. Thereafter, it would use the corresponding "L" value of X1 to proceed to the location (X1,2) to begin the edge tracing process. As previously discussed, the pixels having the characteristic of interest are linked to one another by the value of the pixels, all as set forth in the method and apparatus as disclosed in U.S. Pat. No. 4,538,299. Thus, as each pixel is traced out, the value in the # column is decremented and the value under the "L" column is blanked out or zero. When the particle P1 is completely traced out, the resultant values in the index counter 52 are shown in FIG. 4f.

As can be seen, there still remains the particle P2 with its pixels having the characteristics of interest. However, although the method would start by scanning down until the first non-zero # value is detected (Y=2), the location for the pixel in that row, (namely X=X7) is not stored in the index counter 52. Thus, the computer 40 would then need to scan the row Y=2 until the value of X=X7 is encountered. Thereafter, it can begin the process of edge tracing. As can be seen, this again, wastes computer resources if there are many particles in the same field of view, raster scan of each particle, after the first particle, must be made to find the location of the first pixel in that subsequent particle to be processed.

Accordingly, the present invention is a method and an apparatus to improve the time to locate the pixels having characteristics of interest in a field of view and in particular where more than one particle is imaged in the same field of view.

SUMMARY OF THE INVENTION

In the method of the present invention, the identification of the characteristics of an object in a field of view is disclosed. An electrical image of the field of view is formed in a device. The electrical image is read out from the device to produce an electrical wave form. The wave form is segmented and digitized into a plurality of digital electrical signals with each of the plurality of digital signals corresponding to a pixel of the electrical image. The plurality of digitized signals are processed to form an array of pixels wherein each pixel having the characteristic of interest has a non-zero value and is linked to another pixel also having the characteristic of interest. The array of pixels is stored in a first memory means which is addressable by an address signal of the form X,Y where X is a row address signal and Y is a column address signal. An addressable index memory means stores a plurality of values. Each of the values is an address to the first memory means where the pixel having the characteristic of interest is located. A second memory means has the same addressable dimensions as the first memory means. The second memory means stores in address locations corresponding to address locations in the first memory means where pixels having characteristics of interest are located, values which are addresses to the addressable index memory means, where the content thereof is the address of the first memory means of pixels having the characteristic of interest.

The present invention also relates to an apparatus for implementing the foregoing described method.

BRIEF DESCRIPTION OF THE DRAWINGS

FIGS. 2(a–c) are examples of values of pixels in an array off the same image processed by the apparatus shown in FIG. 1, at various stages.

FIGS. 4(a–c) are examples of values of pixels in an array of the same image processed by the apparatus shown in FIG. 3, at various stages.

FIG. 4(d) is an example of a field of view having a plurality of particles as would be processed by the apparatus of the prior art shown in FIG. 3; with FIGS. 4(e) and 4(f) being contents of the index counter for that example.

FIG. 6 is an example of pixel values of two particles in the same field view as processed by the apparatus of the present invention shown in FIG. 5, as stored in the boundary memory.

FIG. 7 is an example of values stored in the location memory of the apparatus of the present invention for the example of the field of view shown in FIG. 6.

FIG. 8a is an example of values stored in the index memory for the example shown in FIGS. 6 and 7 prior to being processed by the apparatus of the present invention shown in FIG. 5.

FIG. 8b is an example of values stored in the index memory for the example shown in FIGS. 6 and 7 processed by the apparatus of the present invention shown in FIG. 5, after one particle has been traced.

DETAILED DESCRIPTION OF THE DRAWINGS

Figure 1:
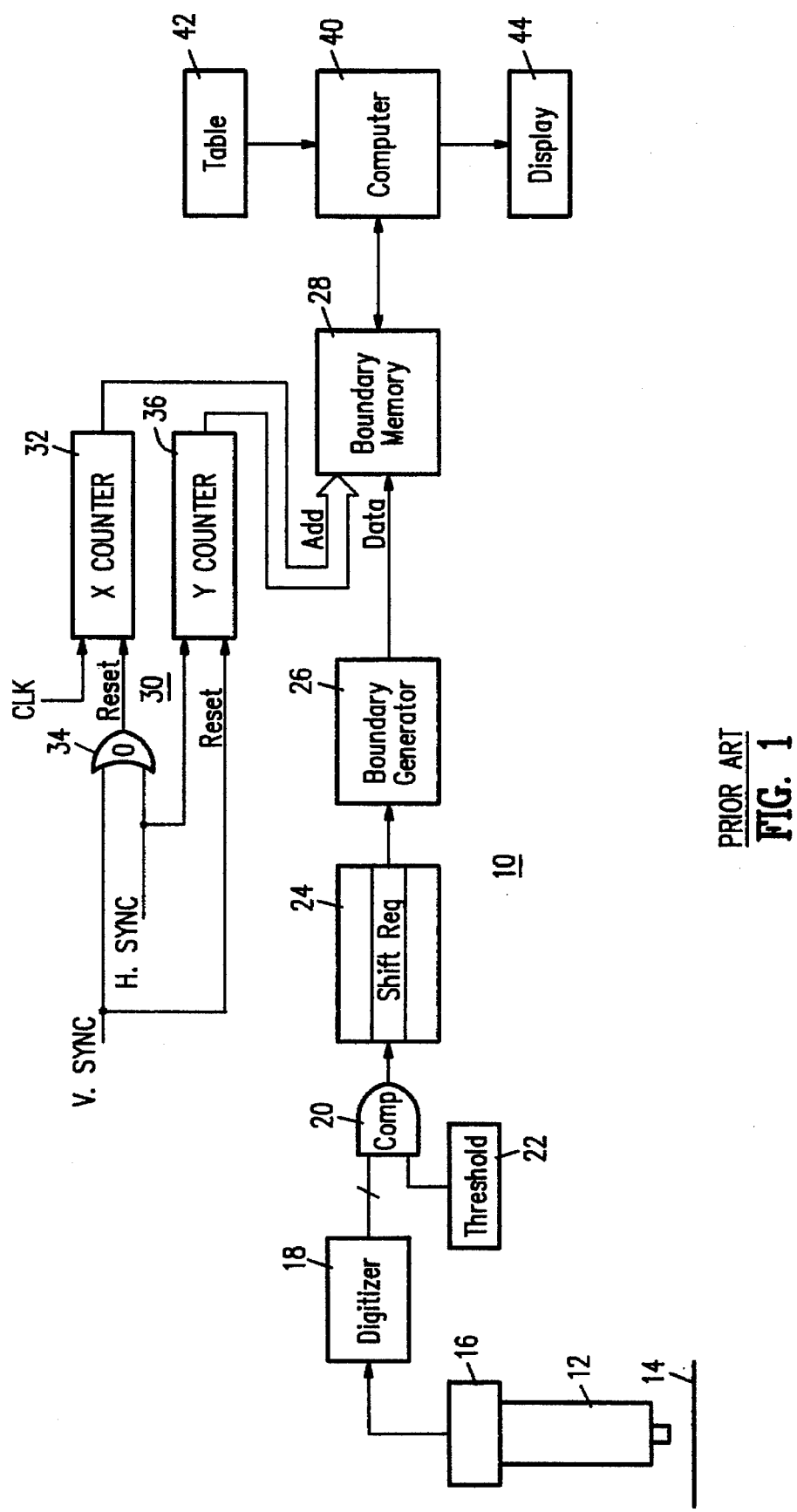
FIG. 1 is a schematic block level diagram of an apparatus of the prior art.
Figure 3:
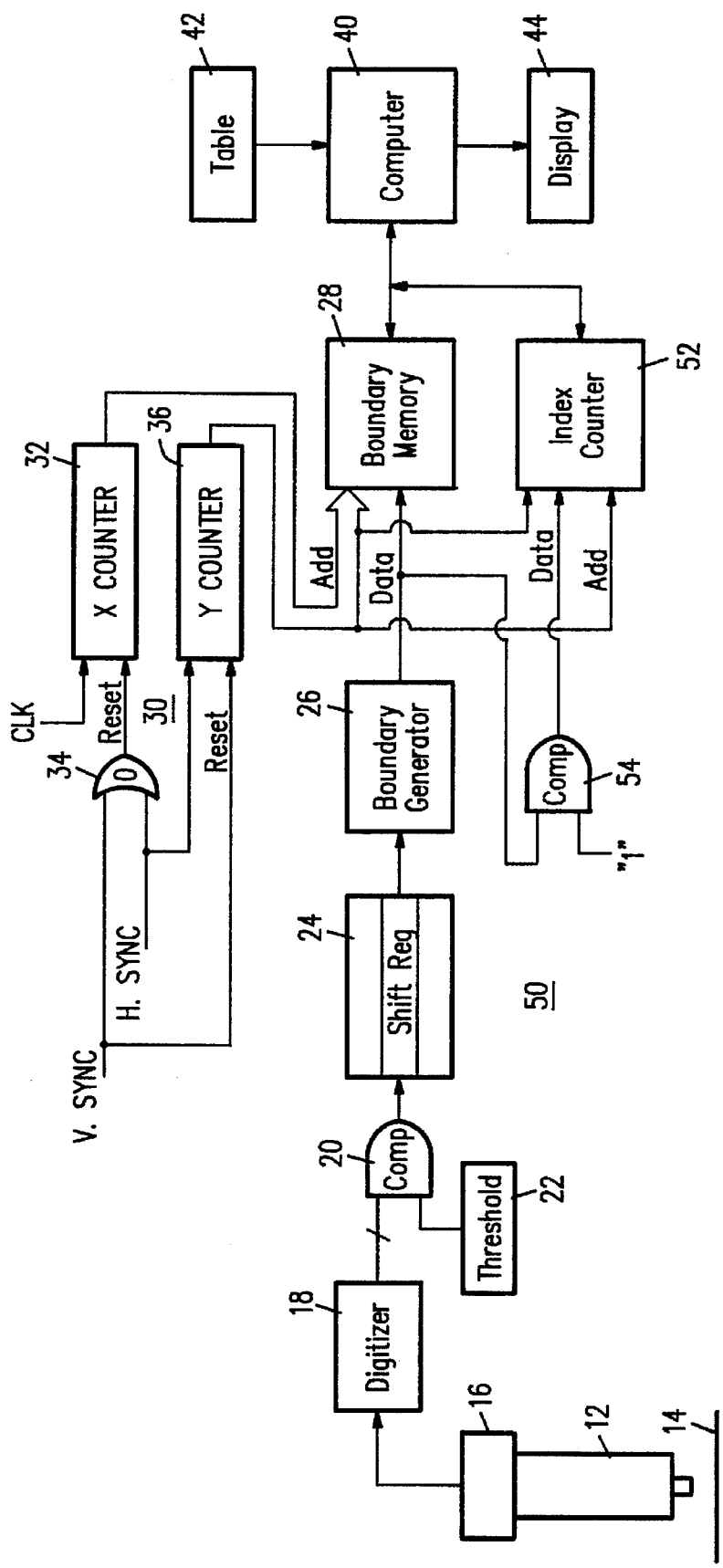
FIG. 3 is a schematic block level diagram of another apparatus of the prior art.
Figure 5:
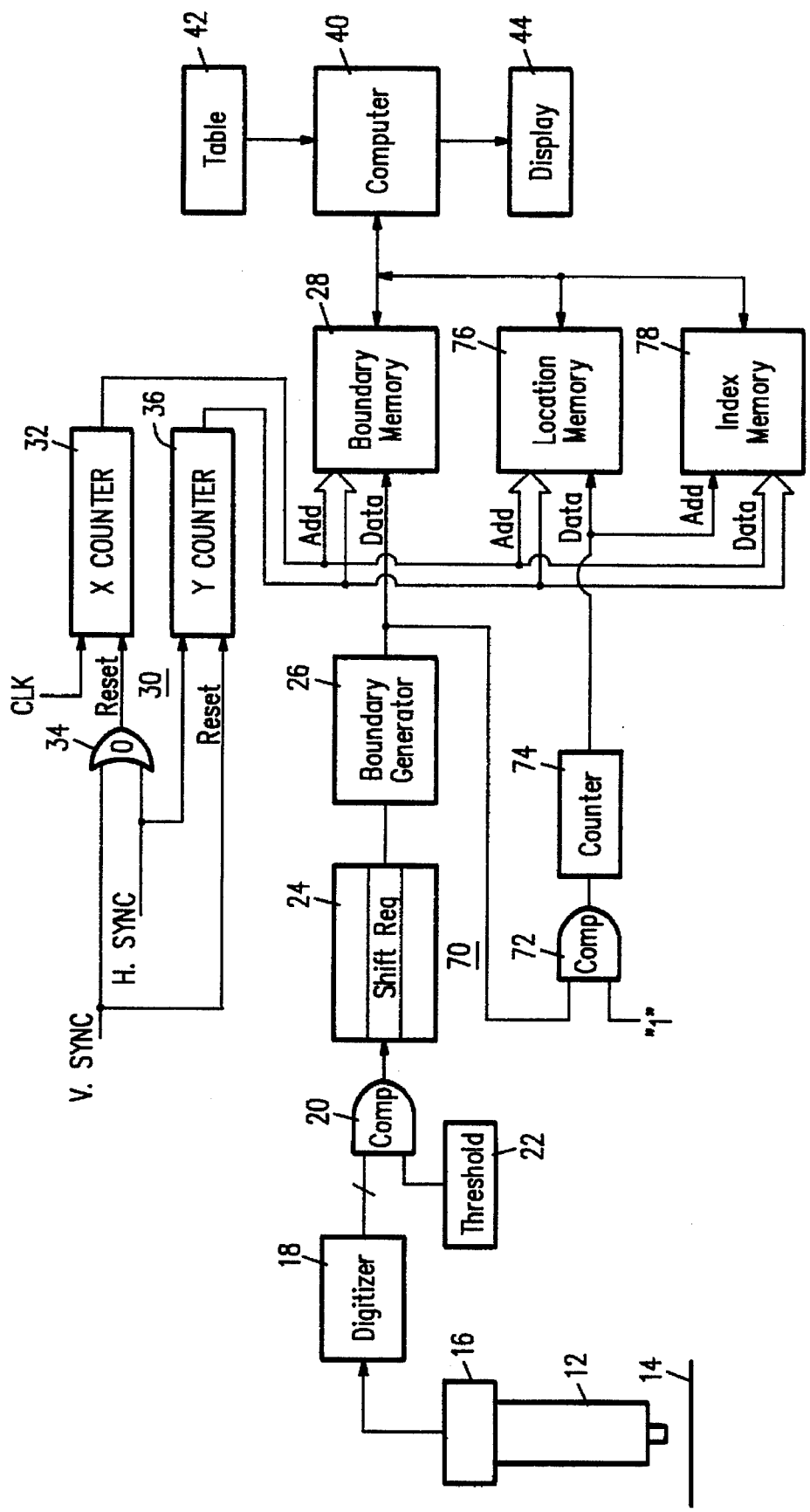
FIG. 5 is a schematic block level diagram of the apparatus of the present invention.

Referring to FIG. 5 there is shown a schematic block level diagram of an apparatus 70 of the present invention. The apparatus 70 comprises many of the same components described heretofore for the apparatus 10 shown in FIG. 1 and the apparatus 50 shown in FIG. 3. These include a microscope 12 directed to focus on a microscopic slide 14 or a flow cell 14, of the type disclosed in U.S. Pat. No. 4,338,024. The image of the field of view is captured by a CCD camera 16, which is a raster scan type device. The CCD camera 16 outputs a raster scan electrical signal which is supplied to a digitizer 18. The digitizer 18 segments the waveform into a plurality of electrical signals with each electrical signal representing a pixel of the image in the field of view. The digitizer 18 further digitizes the amplitude of each electrical signal to produce a greyscale. In the preferred embodiment, the digitizer 18 produces a digital signal having 256 greyscale values. The digitized signals in raster scan format are supplied to a comparator 20 to which a threshold value 22 is also supplied. In the event the digitized signal exceeds the threshold signal 22, then the comparator 20 outputs a binary signal of "1." In the event it does not, the comparator 20 outputs a binary signal of "0."

From the comparator 20, the binary signals are supplied to a shift register 24. The shift register 24 delays and stores the binary signals for two lines of the scan so that the signals in the shift register 24 may be operated upon by a boundary generator 26. The boundary generator 26 operates upon the pixel values stored in the shift register 24 to generate data signals in which the boundary pixels of an object in the field of view have non-zero values with all other pixel values, outside of the boundary and inside the boundary of the particle being zero. This data is then supplied to a boundary memory 28, and is stored therein in an array form with a plurality of pixels arranged in a plurality of rows and columns in the same manner as the field of view is imaged by the microscope 12.

The address to store the data signal from the boundary generator 26 is generated by an address generator 30. The address generator 30 comprises an X counter 32 which is incremented by a clock signal. It is reset by either the horizontal sync or the vertical sync signal passing through an OR gate 34. The address generator 30 also comprises a Y counter 36. The Y counter 36 counts the number of horizontal sync signals, and is reset by the vertical sync signal. The horizontal sync signal and the vertical sync signal are, of course, generated by the CCD camera 16.

The outputs of the X counter 32 and the Y counter 36 are supplied as address signals to the boundary memory 28. In this manner an array of pixel values are stored in the boundary memory 28 based upon the address signals from the address generator 30.

The boundary memory 28 is then accessed by a computer 40. The computer 40 locates the first pixel in the boundary memory 28 that has a boundary value, or a non-zero pixel value. From there, the edge of the particle is then traced based upon the look-up table 42 and is displayed on a display 44.

The apparatus 70 also comprises a location memory 76 having an addressable dimension of the same size as the boundary memory 28. Thus, there are as many X columns in the location memory 76 as there are columns in the boundary memory 28. In addition, location memory 76 has as many Y rows as there are rows in the boundary memory 28. Further, the outputs of the X counter 32 and Y counter 36 are used as address signals for the location memory 76. The apparatus 70 also comprises an index memory 78. The output of the X counter 32 and the Y counter 36 are supplied as data signals to the index memory 78. The output of the boundary generator 26 is supplied to a comparator 72 to which a binary "1" is also supplied. In the event the output of the boundary generator 26 equals or exceeds "1" then a signal is generated which is supplied to a counter 74 incrementing the counter 74. If the boundary generator 26 generates a binary "0" then the output of the comparator 72 would not increment the counter 74. The output of the counter 74 is supplied as a data signal to the location memory 76 and is used as the address signal to the index memory 78.

The operation of the apparatus 70 will be explained with reference to an example. FIG. 6 is an example of two particles: P1 and P2 in the same image or field of view having their boundary pixels at the locations indicated. FIG. 6 shows location of boundary pixels (without the actual values of the pixels shown) of the two particles P1 and P2 as stored in the boundary memory 28. Since in the preferred embodiment, the CCD camera 16 is a raster scan device, the first non-zero pixel value generated by the boundary generator 26 is the pixel value on the boundary of particle P2 having locations (X1, Y1) or (11, 1). Subsequent non-zero pixel boundary values generated by the boundary generator 26 would be (X2, Y2) which is on the boundary of particle P2 having the value of (9,2), etc.

As the first non-zero pixel is generated by the boundary generator 26, it is stored in the boundary memory 28 at the location (X1, Y1). At the same time, the non-zero value of the pixel, as generated by the boundary generator 26, causes the output of the comparator 72 to increment the counter 74 to a value of "1." Thus, at the same corresponding location of (X1, Y1) in the location memory 76, the value of "1" would be stored. This is shown in FIG. 7, which represents the values stored therein in the location memory 76 for this example. At the same time, the value of "1" which is the output of the counter 74, is used as an address to the index memory 78 to store the output of the X counter 32 and Y counter 36 (X1, Y1) in the index memory 78, at the address of "1". This is shown in FIG. 8a.

As each subsequent non-zero pixel value is generated by the boundary generator 26, the output of the X counter 32 and Y counter 36 are used as the address signals to store that non-zero pixel value in the boundary memory 28. The same address locations of the boundary memory 28 or the same output values of X counter 32 and Y counter 36 are used to address the location memory 76 to store the incremented data from the counter 74. Finally, at the same time, the address to the index memory 78 is the output of the counter 74, and is used to address the index memory 78, to store the outputs of X counter 32 and Y counter 36.

Once all of the non-zero boundary pixel values from the field of view as imaged by the CCD camera 16 have been generated by the boundary generator 26, the computer 40 would then begin the process of identifying the pixels having the characteristics of interest. Although in this embodiment, the characteristic of interest is disclosed as being a boundary edge, it can clearly be any characteristic of interest.

In the method of identifying the pixels having the characteristics of interest, the computer 40 first scans the index memory 78 sequentially from the lowest addressable position of "1" until the first "non-zero" value in the content at the scanned address is determined. In this case, at the beginning of the process, the very first addressed entry of "1" having a stored value of X1, Y1, would be retrieved by the computer 40. The computer 40 would then address the boundary memory 28 at the location of X1, Y1, and retrieve a pixel value of say P1. Using the same address signals of X1, Y1, the location memory 76 is addressed. The content of the location memory 76 at the location of X1, Y1 is the value "1." The value of that content (i.e. "1") is then used as an address to the index memory 78 and the content at that addressed location in the index memory 78 is then blanked out. In that case, the index memory 78 at the first addressed location of 1 would be blanked out.

The value of the pixel at the addressed location of X1, Y1 in the boundary memory 28, i.e. P1, is processed by the computer 40. In the event the value of the pixel P1 represents a boundary edge, the value of P1 would contain a code linking to the next non-zero pixel also along the boundary—all as disclosed in U.S. Pat. No. 4,538,299. If we assume that the linked pixel is at the location X3, Y3. The computer 40 would then retrieve the content of the boundary memory 28 at the location X3, Y3. In addition, the computer 40 would use the address X3, Y3 to address the location memory 76 to find a content at that location of "3." Then, the computer 40 would use the value of "3", from the location memory 76, as an address to the index memory 78 to zero out the content at the addressed location of "3" in the index memory 78. This would cause the content X3, Y3 to be blanked out.

The computer 40 would then retrieve the value of the pixel at X3, Y3 from the boundary memory 28 and analyze and determined the next linked non-zero pixel value, having the characteristic of interest. Let us assume that this is X6, Y6. The computer would then address the boundary memory 28 at X6, Y6 to read out the value of the non-zero pixel at that location. In addition, the computer 40 would use X6, Y6 as addresses for the location memory 76 to read out the pixel value at that location which is "6." Then, the computer will use the value of "6" as an address in the index memory 78 and blank out its content which is X6, Y6.

This process continues until all of the boundary edges of particle P2 have been determined. In the process, selective locations in the index memory 78 are blanked out. In the example shown in FIGS. 6, 7, and 8a, this means that addressed locations 1, 3, 6, 10, 14, 18, 19, 17, 13, 9, 5, 2 in the index memory 78 are blanked out. The result is shown in FIG. 8b.

The computer 40 then scans the index memory 78 starting from the last location in the index memory 78, where a non-zero value was found, or starting from the lowest addressed location of "1" to determine if a non-zero value remains in the index memory 78. In this case, after 4 address locations or 4 tests, the computer 40 would find that the addressed location of 4 results in a non-zero value of X4, Y4 stored in the index memory 78. It would then use the value of X4, Y4 as a starting address addressing the boundary memory 28 and complete the cycle all over again.

From the foregoing, it can be seen that with the method and apparatus of the present invention, a plurality of particles in the same field of view having pixels with characteristics of interest can be rapidly identified. Further, the process requires a number of steps directly proportional to the number of boundary pixels independent of the particle positions in the field of view.

What is claimed is:

1. A method of identifying the characteristics of an object in a field of view; said method comprising:
    forming an electrical image of said field of view in a device;
    reading out said electrical image from said device to produce an electrical waveform;
    segmenting and digitizing said waveform into a plurality of digitized electrical signals, each of said plurality of digitized electrical signals corresponding to a pixel of said electrical image;
    processing said plurality of digitized signals to form an array of pixels wherein each pixel having the characteristic of interest has a non-zero value and is linked to another pixel also having the characteristic of interest;
    storing said array in a first memory means, addressable by an address signal of the form (X,Y) where X is a column address signal and Y is a row address signal;
    storing in an addressable index memory means a plurality of values, each value being an address to said first memory means where a pixel having the characteristic of interest is located; and
    storing in a second memory means, having the same addressable dimensions as said first memory means, in address locations corresponding to address locations in said first memory means where pixels having characteristics of interest are located, values which are addresses to said addressable index memory means where the content is the address of said first memory means of pixels having the characteristic of interest.

2. The method of claim 1 wherein said three storing steps occur substantially simultaneously.

3. The method of claim 1 further comprising the steps of:
    (a) scanning said index memory means until a first non-zero value is found;
    (b) addressing said first memory means using said first non-zero value as an address;
    (c) retrieving the content of said first memory means addressed by step (b);
    (d) addressing said second memory means using said first non-zero value as an address;
    (e) retrieving the content of said second memory means addressed;
    (f) addressing said index memory means using said content from said second memory means;
    (g) blanking the content of said index memory means addressed by step (f);
    (h) addressing a location in said first memory means linked to the content retrieved;
    (i) addressing the same location in said second memory means as the address from step (h);
    (j) repeating steps (e)–(i), until all linked contents from first memory means have been processed;
    (k) returning to step (a).

4. The method of claim 1 wherein the characteristic of interest is a boundary of a particle.

5. An apparatus for processing a characteristic of interest of an object in a field of view, said apparatus comprising:
    raster scan imaging means for forming an electrical image of the field of view and for outputting an electrical wave form representative of the field of view;
    means for segmenting said electrical wave form into an array of pixels, and for digitizing each pixel in said array into a digitized signal;
    processing means for processing said array of pixels into a first representation wherein each pixel having the characteristic of interest has a non-zero value and is linked to another pixel also having the characteristic of interest;
    first memory means for storing said first representation;
    said first memory means addressable by an address of the form (X,Y) where X is the column address to the pixel array and Y is the row address to the pixel array;
    addressable index memory means having a plurality of contents, with each content addressable by an address, each content being an address for the first memory means where a pixel having the characteristic of interest is located; and second memory means having the same addressable dimensions as said first memory means wherein each location in said second memory means has a corresponding location in said first memory means, and wherein the content of a location in said second memory means corresponding to a location in said first memory means where a pixel has the characteristic of interest, has an address addressing said index memory means, to address the first memory means where the pixel having the characteristic of interest is located.

6. The apparatus of claim 5 wherein the characteristic of interest is a boundary of a particle.

7. A method of identifying pixels, having a certain characteristic, of an object in a field of view, said method comprising:

forming an electrical image of the field of view in a device;

reading out said electrical image in a raster scan format from said device to produce an electrical waveform;

segmenting said electrical waveform into a plurality of electrical signals, each of said plurality of electrical signals corresponding to a pixel of said image;

digitizing the amplitude of each of said electrical signals to form a greyscale signal;

processing each greyscale signal to identify pixels having the certain characteristics and to identify their location;

storing said pixels identified in locations identified in a first memory array;

storing the locations identified in a sequential index memory means; and storing an address of the index memory means at the same locations identified in a second memory array.

8. The method of claim 7 wherein said three storing steps occur substantially simultaneously.

9. The method of claim 8 further comprising the steps of:

(a) scanning said index memory means until a first non-zero value is found;

(b) addressing said first memory array using said first non-zero value as an address;

(c) retrieving the content of said first memory array addressed by step (b);

(d) addressing said second memory array using said first non-zero value as an address;

(e) retrieving the content of said second memory array addressed;

(f) addressing said index memory means using said content from said second memory array;

(g) blanking the content of said index memory means addressed by step (f);

(h) addressing a location in said first memory array linked to the content retrieved;

(i) addressing the same location in said second memory array as the address from steps (h);

(j) repeating steps (e)–(i), until all linked contents from first memory array have been processed;

(k) returning to step (a).

10. The method of claim 7 wherein the characteristic of interest is a boundary of a particle.

11. The method of claim 7 wherein said processing step processes each greyscale signal to form a binary signal, and wherein each of said binary signals is processed to identify pixels having the certain characteristics and to identify their location.

12. A method of identifying the boundary of a particle in a field of view; said method comprising:

forming an electrical image of said field of view in a device;

reading out said electrical image from said device to produce an electrical waveform;

segmenting and digitizing said waveform into a plurality of digitized electrical signals, each of said plurality of digitized electrical signals corresponding to a pixel of said electrical image;

processing said plurality of digitized signals to form an array of pixels wherein each pixel corresponding to the boundary of said particle has a non-zero value and is linked to another pixel corresponding to the boundary of said particle and wherein a pixel not corresponding to the boundary of said particle has a zero value;

storing said array in a first memory means, addressable by an address signal of the form (X,Y) where X is a column address signal and Y is a row address signal;

storing in an index memory means a plurality of values, each value being an address to said first memory means where a pixel having a non-zero value is located; and storing in a second memory means, having the same addressable dimensions as said first memory means, in address locations corresponding to address locations in said first memory means where pixels having non-zero values are located, values which are addresses to said index memory means where the content is the address of said first memory means of pixels having the non-zero values.

13. The method of claim 12 further comprising the steps of:

(a) scanning sequentially said index memory means until a first non-zero value is found;

(b) addressing said first memory means using said first non-zero value as an address;

(c) retrieving the content of said first memory means addressed by step (b);

(d) addressing said second memory means using said first non-zero value as an address;

(e) retrieving the content of said second memory means addressed;

(f) addressing said index memory means using said content from said second memory means;

(g) storing zero as the content of said index memory means addressed by step (f);

(h) addressing a location in said first memory means linked to the content retrieved;

(i) addressing the same location in said second memory means as the address from step (h);

(j) repeating steps (e)–(i), until all linked contents from first memory means have been processed;

(k) returning to step (a).

14. The method of claim 13 wherein said three storing steps occur substantially simultaneously.

* * * * *